United States Patent
Nattkemper et al.

(10) Patent No.: US 7,239,627 B2
(45) Date of Patent: Jul. 3, 2007

(54) DIGITAL SUBSCRIBER LINE SERVICES

(75) Inventors: Dieter H. Nattkemper, Raleigh, NC (US); Robert S. Kroninger, Wake Forest, NC (US); Shaji Thomas, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 982 days.

(21) Appl. No.: 09/865,216

(22) Filed: May 24, 2001

(65) Prior Publication Data
US 2002/0176411 A1 Nov. 28, 2002

(51) Int. Cl.
*H04L 12/66* (2006.01)
*H04J 3/08* (2006.01)
*H04M 11/00* (2006.01)
*H04N 7/173* (2006.01)

(52) U.S. Cl. .............. 370/352; 370/463; 370/502; 379/93.08; 379/142.13; 379/399.01; 725/119

(58) Field of Classification Search ............. 370/352, 370/463, 502; 379/93.08, 142.13, 399.01; 725/119
See application file for complete search history.

(56) References Cited

U.S. PATENT DOCUMENTS

| | | | | |
|---|---|---|---|---|
| 5,970,473 A * | 10/1999 | Gerszberg et al. | ............ | 705/26 |
| 6,028,867 A * | 2/2000 | Rawson et al. | ............ | 370/463 |
| 6,130,879 A | 10/2000 | Liu | | |
| 6,166,895 A | 12/2000 | Dziedzic | | |
| 6,181,715 B1 | 1/2001 | Phillips et al. | | |
| 6,236,664 B1 | 5/2001 | Erreygers | | |
| 6,351,487 B1 * | 2/2002 | Lu et al. | ............ | 375/225 |
| 6,396,911 B1 * | 5/2002 | Kostan et al. | ............ | 379/93.14 |
| 6,414,952 B2 * | 7/2002 | Foley | ............ | 370/352 |
| 6,445,787 B1 * | 9/2002 | Vaidya et al. | ............ | 379/243 |
| 6,480,487 B1 * | 11/2002 | Wegleitner et al. | ............ | 370/354 |
| 6,829,246 B2 * | 12/2004 | Silberman et al. | ............ | 370/463 |
| 6,853,647 B1 * | 2/2005 | Rawson et al. | ............ | 370/463 |
| 6,873,628 B1 * | 3/2005 | Tang | ............ | 370/480 |
| 6,886,181 B1 * | 4/2005 | Dodds et al. | ............ | 725/119 |
| 6,928,068 B1 * | 8/2005 | Crowe et al. | ............ | 370/352 |
| 6,978,015 B1 * | 12/2005 | Erickson et al. | ............ | 379/417 |
| 6,990,110 B2 * | 1/2006 | Nattkemper et al. | ............ | 370/397 |
| 7,009,977 B1 * | 3/2006 | Ewell et al. | ............ | 370/395.1 |
| 2004/0071101 A1 * | 4/2004 | Lu et al. | ............ | 370/282 |

FOREIGN PATENT DOCUMENTS

WO        WO 00/39948        7/2000

* cited by examiner

*Primary Examiner*—Alpus H. Hsu
(74) *Attorney, Agent, or Firm*—David N. Fogg; Fogg & Powers LLC

(57) ABSTRACT

A system for extending the effective distance of digital subscriber line service is provided. The system includes a central office terminal having a data interface and a plurality of line units. The system further includes at least one communication link, coupled to one of the plurality of line units, that carries signals using digital subscriber line service and at least one remote access multiplexer, coupled to the at least one communication link. The at least one remote access multiplexer includes a plurality of ports that are adapted to provide digital subscriber line service. The remote access multiplexer is adapted to multiplex signals between the plurality of ports and the at least one communication link. Further, the at least one remote access multiplexer is located at a distance from the central office terminal so as to provide digital subscriber line service to user terminals that are located more than 12 kilofeet from the central office terminal.

26 Claims, 5 Drawing Sheets

DIGITAL SUBSCRIBER LINE SERVICES

TECHNICAL FIELD

The present invention relates generally to the field of telecommunications and, in particular, to provisioning digital subscriber line services.

BACKGROUND

Broadband penetration rates among residential customers are fast approaching 20% of all on-line subscribers and demand for high-speed Internet access is growing. Competition for these lucrative high-margin customers is fierce and also growing. Although asymmetric digital subscriber line (ADSL) is the primary choice of most customers for their broadband services, slow ADSL roll-outs by service providers and limitations of today's digital subscriber line access multiplexer (DSLAM) technology have left large gaps in the ADSL deployment strategies of many local telephone companies. These gaps are quickly being filled by cable operators eager to capture high-margin revenues that broadband service offerings attract, not to mention the growing opportunity for cable operators to offer bundled voice and data services and gain a toe-hold in the voice services market.

Two significant gaps in most local telephone companies ADSL service offerings are an inability to serve DAML (digitally added main line) customers and residential/small business customers that live beyond the 12,000 ft ADSL serving area. These two segments represent over 20% of the total ADSL market and neither segment can get ADSL service using traditional ADSL equipment.

DAMLs are devices that local telephone companies deploy to residences needing multiple plain old telephone service (POTS) lines, when there is a shortage of copper loops. For more than a decade, digital added main lines (DAMLs/AMLs) have provided carriers with a simple solution for copper pair relief of voice services. Although DAMLs provide multiple POTS lines over an existing copper pair, DAMLs do not support ADSL service delivery. Today, the two to three million customers that are currently served with DAML/AML devices are among the heaviest home users of telecommunication services. To further exacerbate this situation, recent studies show that nearly 75% of all multi-line residential customers are interested in ADSL-based service. With the majority of multi-line households desiring broadband services local telephone companies are not able to meet the needs of these premium customers. Currently, carriers are forced to not offer ADSL to this large segment of premium customers because carriers cannot justify the high cost of placing new cable to deliver ADSL to these customers. Many of these customers are looking to cable operators to meet their need for high-speed Internet access. The resulting situation has left many local telephone companies frustrated for they have a ready-made ADSL subscriber base but cannot satisfy the demand without enormous outside cable plant upgrades. Local telephone companies need a solution that will enable them to compete effectively with cable operators for this lucrative market segment.

The second major gap in most local telephone ADSL service deployments is the 20% of residential subscribers that live beyond 12,000 ft from a central office (CO) or remote Digital Loop Carrier (DLC) location. Poor loop quality and other technical limitations of Digital Subscriber Line Access Multiplexer (DSLAM) equipment installed by local telephone companies limits many asymmetric digital subscriber line (ADSL) deployments to 12,000 ft to 15,000 ft from a central office (CO) or digital loop carrier (DLC) remote. Some of the technical limitations of DSLAMS include:

- DSLAMs/Remote DSLAMs are practical only to about 12,000 ft from a CO or DLC.
- A DSLAM/Remote DSLAM is limited to offering only one voice circuit with every ADSL interface.
- DSLAMs/Remote DSLAMs cannot serve multiple POTS lines and ADSL to a single home without a costly upgrade to a voice over a digital subscriber line—DSLAM, voice-gateway and locally powered integrated access device.

Residential customers located beyond 12,000 ft of a typical 18,000 ft carrier serving area (CSA), however, comprise about 20 percent of the total ADSL market and are among the heaviest users of telecommunication services. Cable operators are aggressively targeting these "long reach" customers with cable modems that offer significantly higher bandwidth than ADSL service at the same distances. Local telephone companies need a solution that will enable them to compete effectively with cable operators for delivery of high-speed Internet access to these hard to reach customers.

Unfortunately for many local telephone companies, DAML-based and long-reach customers are beginning to purchase data service from cable operators. Regrettably, that lost business may be difficult to recover. Even more unwelcome is the fact that the cable companies will, sooner or later, be offering voice services.

For the reasons stated above, and for other reasons stated below which will become apparent to those skilled in the art upon reading and understanding the present specification, there is a need in the art for improvements in the provision of asymmetric digital subscriber line services.

SUMMARY

The above mentioned problems with the provision of digital subscriber line (DSL) service and other problems are addressed by embodiments of the present invention and will be understood by reading and studying the following specification.

In one embodiment, a system for extending the effective distance of digital subscriber line service is provided. The system includes a central office terminal having a data interface and a plurality of line units. The system further includes at least one communication link, coupled to one of the plurality of line units, that carries signals using digital subscriber line service and at least one remote access multiplexer, coupled to the at least one communication link. The at least one remote access multiplexer includes a plurality of ports that are adapted to provide digital subscriber line service. The remote access multiplexer is adapted to multiplex signals between the plurality of ports and the at least one communication link. Further, the at least one remote access multiplexer is located at a distance from the central office terminal so as to provide digital subscriber line service to user terminals that are located more than 12 kilofeet from the central office terminal.

In one embodiment, a system for providing multi-line telephony service and digital subscriber line service over a common connection is provided. The system comprises a central office terminal having a data interface, a telephony interface, and a plurality of line units. The system further includes a communication link coupled to one of the plurality of line units and at least one remote terminal, coupled to the at least one communication link, the remote terminal powered over the at least one communication link. The remote terminal supports service for at least two telephony lines and digital subscriber line over the communication link.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide improvements in providing digital subscriber line (DSL) services, e.g., asymmetric digital subscriber line (ADSL), high bit rate digital subscriber line (HDSL), HDSL2, ISDN digital subscriber line (IDSL), and other xDSL services. In particular, embodiments of the present invention fill a critical gap in delivering DSL service to subscribers that are more than 12,000 feet from a central office or a digital loop carrier by extending the reach limit for DSL to up to 30,000 feet from the central office or digital loop carrier remote location. Essentially employing equipment that picks up where the digital subscriber line access multiplexer/remote digital subscriber line access multiplexer (DSLAM/RDSLAM) leaves off. Thereby, embodiments of the present invention enable local telephone companies to provide DSL over existing copper, extending the effective DSL serving range to 30,000 feet and complementing central office based DSLAMs and DLC-based remote DSLAMs that have an effective reach of approximately 12,000 feet.

Figure 1:
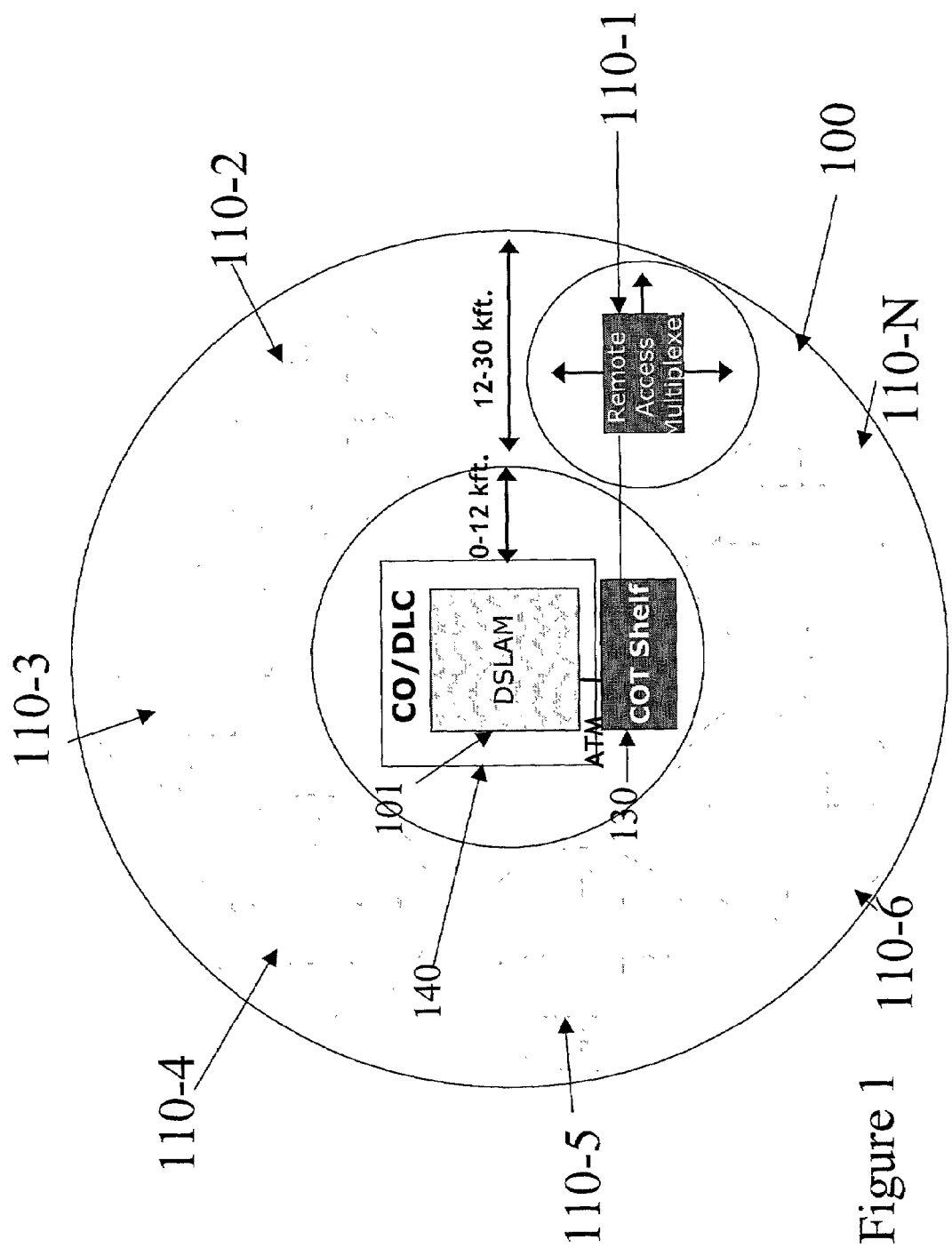
FIG. 1 is a block diagram of an embodiment of a communications system including a remote access multiplexer according to the teachings of this invention.

FIG. 1 is a block diagram of one embodiment of a communications system, indicated generally at 100, including a remote access multiplexer 110-1 according to the teachings of this invention. The remote access multiplexer 110-1 is coupled to a central office terminal (COT) shelf 130 located at the central office 140. The COT shelf 130 is coupled to a DSLAM 101, DLC or the like located at the central office 140 or a remote location such as a remote DLC. When located at a remote location the shelf may be internal to the DLC or located in a separate environmentally protected housing. In this embodiment, the central office shelf 130 is considered a field shelf. In one embodiment, the COT shelf 130 includes a plurality of central office line units. The COT shelf 130 is adapted to couple to a plurality of remote access multiplexers 110-1 to 110-N via one or more communication links. In one embodiment, each communication link comprises a single twisted pair. Single pair high-speed digital subscriber lines (SHDSLs) service is provided on each twisted pair and each SHDSL provides DSL service for up to 8 customers. In one embodiment, the DSL service is ADSL. In one embodiment, each remote access multiplexer 110-1 to 110-N is capable of accepting up to three twisted pairs each carrying SHDSL service and as a result providing DSL to up to 24 customers. The remote access multiplexers 110-1 to 110-N are each located between 12,000 and 15,000 feet from the central office 140 or DLC and support DSL subscriber drops of 12,000 to 15,000 feet, increasing the effective DSL carrier service area up to 30,000 feet. In one embodiment, the remote access multiplexers 110-1 to 110-N incorporate a splitter that combines existing POTS service with DSL. The combined POTS and DSL services are delivered to the customer over an existing copper pair from the remote access multiplexers 110-1 to 110-N. In addition to combined POTS and DSL service over a single twisted pair the remote access multiplexer 110 is line powered and brings lifeline POTS support to the customers.

Figure 2:
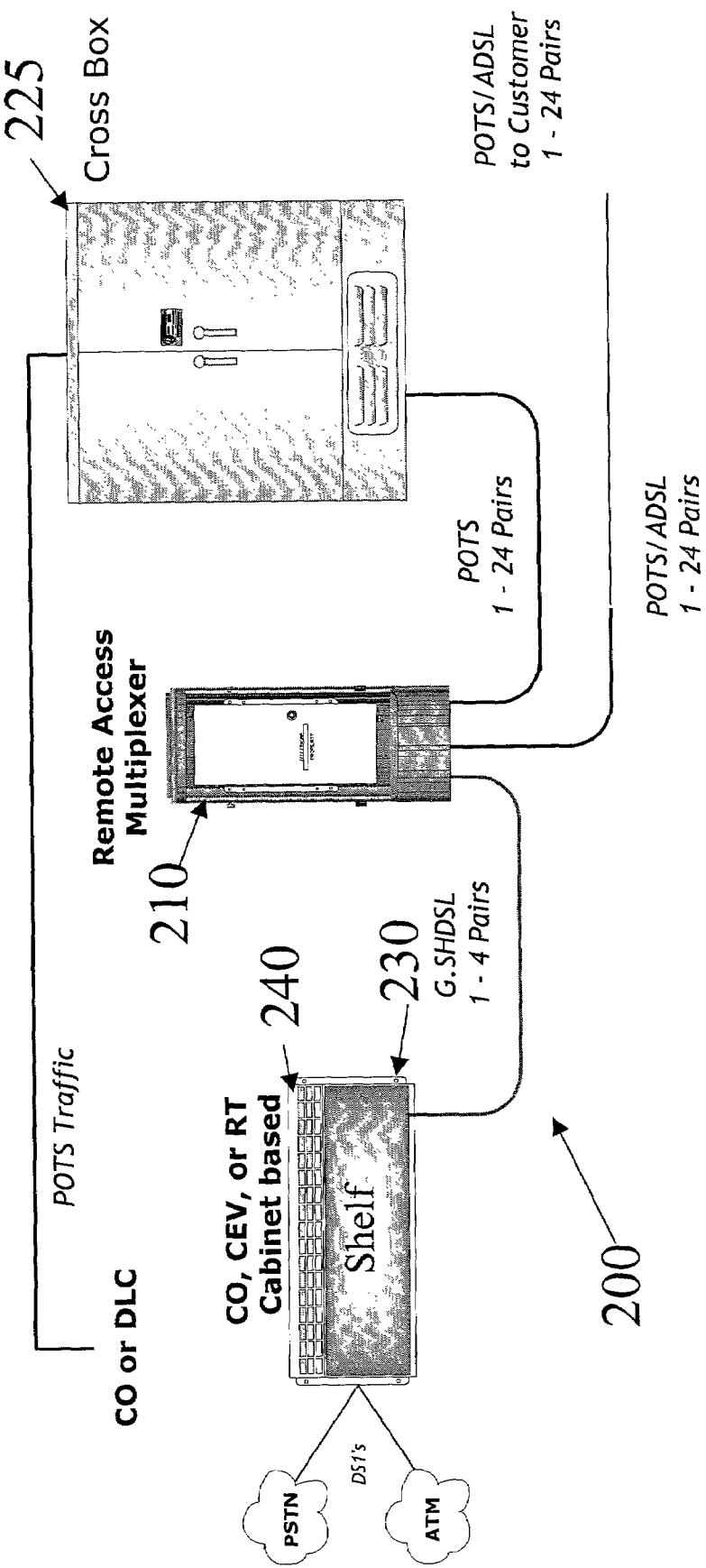
FIG. 2 is a block diagram of another embodiment of a communications system including a remote access multiplexer according to the teachings of this invention.

FIG. 2 is a block diagram of another embodiment of a communications system, indicated generally at 200, including a remote access multiplexer 210 according to the teachings of this invention. Remote access multiplexer 210 is coupled to a central office terminal (COT) shelf 230 within a central office 240. In one embodiment, the central office 240 is coupled to one or more networks such as the public switched telephone network, asynchronous transfer mode (ATM) access network or the like. The COT shelf 230 provides an interface to a data network such as an ATM network and the public switched telephone network (PSTN). In one embodiment, the interface to the PSTN is TDM based for example DS-1. In one embodiment, the interface with the data network is via a physical interface such as a DS3 ATM user network interface (UNI).

In one embodiment, the COT shelf 230 includes a plurality of central office line units each line unit having at least one port capable of providing SHDSL service. In one embodiment, each central office line unit includes 3 ports, each port capable of providing SHDSL. Each port of a central office line unit is adapted to couple to a remote access multiplexer such as remote access multiplexer 210 via a communication link that carries the SHDSL service. In one embodiment, the communication link comprises a single twisted copper pair. The SHDSL service carried over a single copper pair provides DSL to up to 8 customers. In one embodiment, remote access multiplexer 210 includes a plurality of ports each adapted to provide DSL and POTS. In one embodiment, remote access multiplexer 210 provides only DSL via each port. In one embodiment, the DSL service is ADSL service. In one embodiment, each port is coupled to a customer via a single twisted pair and provides DSL or DSL plus POTS service. In one embodiment, remote access multiplexer 210 comprises one or more multiplexer cards that multiplex signals received from one or more customers over twisted pairs onto the communication link between the remote access multiplexer 210 and the central office 210 as SHDSL for transmission to central office 240. In one embodiment, remote access multiplexer 210 receives data and voice signals from one or more customers over twisted pairs and the signals are split into voice and data. Voice signals are multiplexed onto a POTS line and the data signals are multiplexed onto the communication link between the remote access multiplexer 210 and the central office 240 as SHDSL for transmission to the central office 240.

In one embodiment, the COT shelf 230 also includes a multiplexer that collects all of the data from each line unit and is linked through a DS3 UNI to the data network.

In one embodiment, the remote access multiplexer 210 accesses POTS via a cross box 225 from an alternate central office 208, digital loop carrier or the like. The remote access multiplexer 210 combines the POTS and single pair high-speed digital subscriber line (SHDSL) service to provide POTS and DSL on a single twisted pair. In one embodiment, remote access multiplexer 210 is capable of providing DSL and POTs service to 24 customers up to 15,000 feet from the remote access multiplexer 210. In addition to combined POTS and DSL service over a single twisted pair the remote access multiplexer 210 is powered over the same twisted pair that brings SHDSL service. This provides POTS lifeline support to the customers.

In one embodiment, remote access multiplexer 210 includes a plurality of cards that each provides DSL and POTS service to up to 8 customers. In one embodiment, the remote access multiplexers such as remote access multiplexer 210 are enclosed in an environmentally protected enclosure.

Figure 3:
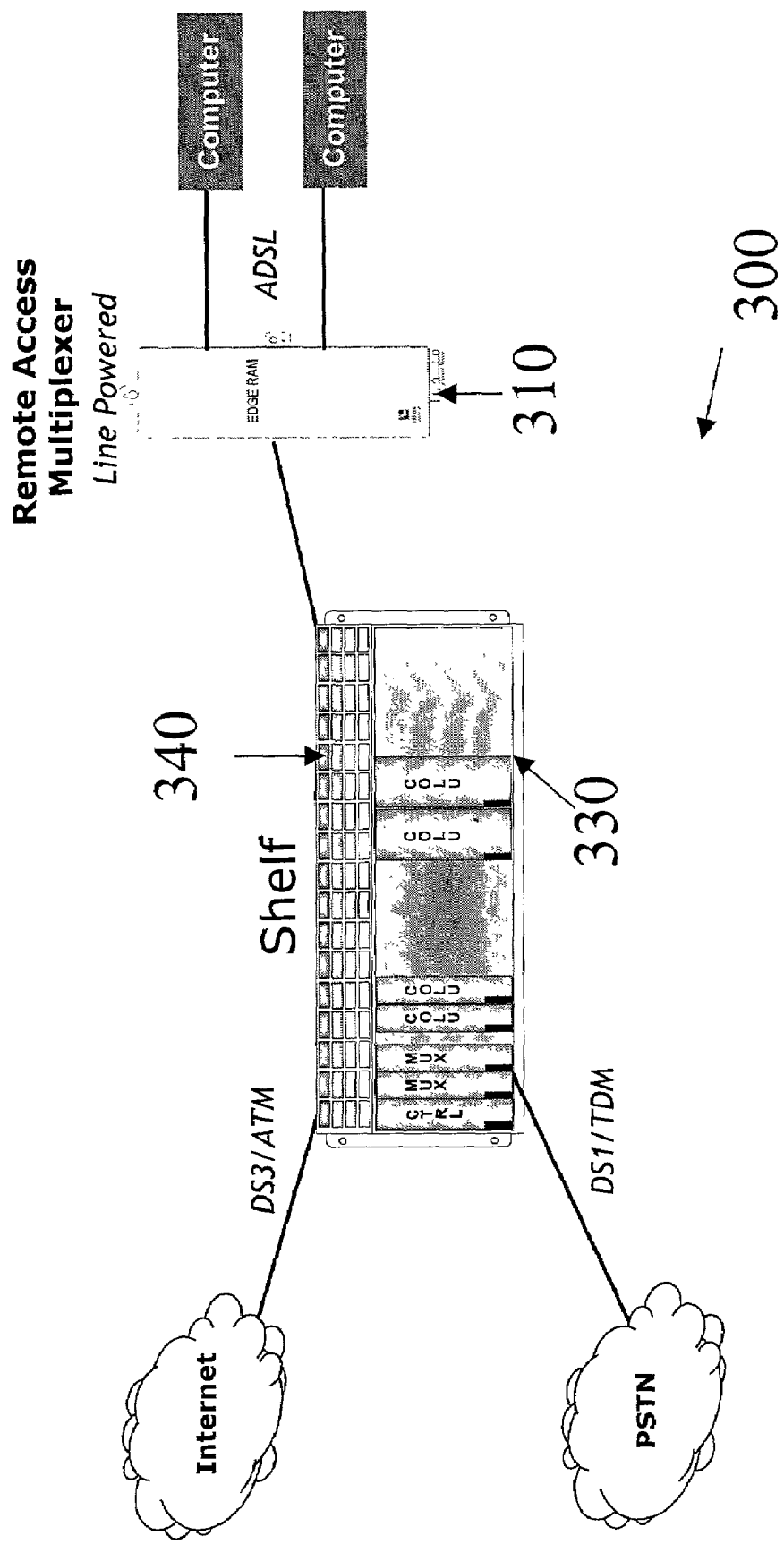
FIG. 3 is a block diagram of a further embodiment of a communications system including a remote access multiplexer according to the teachings of this invention.

FIG. 3 is a block diagram of a further embodiment of a communications system, indicated generally at 300, including a remote access multiplexer 310 according to the teachings of this invention. Remote access multiplexer 310 is coupled to a central office terminal (COT) shelf 330 within a central office 340 as discussed with respect to remote access multiplexer 210 of FIG. 2. The central office 340 is coupled to one or more networks such as the public switched telephone network, an asynchronous transfer mode (ATM) access network or the like. In this embodiment, the remote access multiplexer 310 provides only DSL service to one or more users each over a single twisted pair. In one embodiment, the DSL service is ADSL service. In addition to DSL service over the single twisted pair that is coupled to the COTS shelf 330, the single twisted pair provides power for the remote access multiplexer 310. As a result this provides POTS lifeline support to the customers.

In addition, embodiments of the present invention fill a critical gap in delivering multiple lifeline POTS as well as high speed Internet access to end-users in areas of copper exhaust that are currently served by digitally added main line (DAML/AML) devices. Embodiments of the present invention enable carriers to satisfy the needs of premium residential and small business subscribers, who up to this point, could only turn to cable operators for high-speed Internet access. Essentially, embodiments of the present invention simultaneously deliver DSL and multiple POTS lines to subscribers currently served by DAML/AML equipment. This is accomplished without requiring a costly cable plant upgrade. Delivering multiple local telephone company grade lifeline POTs and a high-speed DSL connection on a single unbundled copper pair reduces costs while maximizing revenues. Embodiments of the present invention deliver local telephone company grade lifeline POTS using full pulse code modulation (PCM) over 64 kbps of dedicated bandwidth for each POTS line. In addition, embodiments of the present invention transport voice service using channelized voice over DSL (CVoDSL), thereby eliminating the need for ATM voice gateways.

Figure 4:
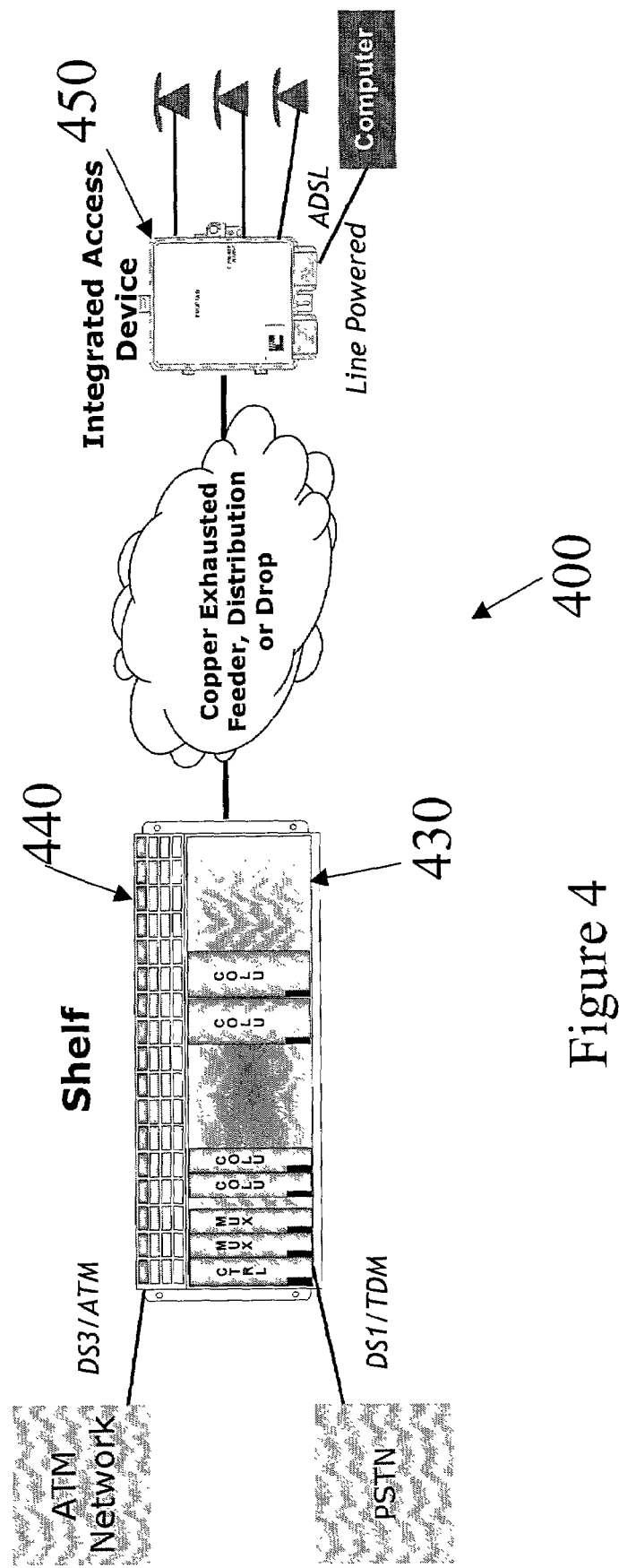
FIG. 4 is a block diagram of an embodiment of a communications system including an integrated access device according to the teachings of this invention.

FIG. 4 is a block diagram of one embodiment of a communications system, indicated generally at 400, including an integrated access device 450 according to the teachings of this invention. The integrated access device 450 is coupled to a central office terminal (COT) shelf 430 via a twisted pair (Copper exhausted feeder, distribution or drop). The COT shelf 430 is located within a central office 440 or subtended from a DLC remote and is coupled to one or more networks such as the public switched telephone network, an ATM access network or the like. In one embodiment, integrated access device 450 is environmentally hardened for employment outdoors. In another embodiment, integrated access device 450 is designed for employment indoors.

The COT shelf 430 provides an interface to a data network such as an ATM network and the public switched telephone network (PSTN). In one embodiment, the interface to the PSTN is TDM based for example DS-1. In one embodiment, the interface with the data network is ATM based for example DS-3.

In one embodiment, the COT shelf 430 includes a plurality of central office line units each line unit having at least one port capable of providing multiple POTS and DSL service. In one embodiment, the central office includes up to 16 central office line units and each line unit includes 2 ports each port capable of providing multiple POTS and DSL. Each port of a central office line unit is adapted to couple to the integrated access device 450 via a communication link that carries the multiple POTS and DSL service. In one embodiment, the communication link comprises a single twisted copper pair.

In operation, the integrated access device 450 combines multiple voice channels and a data channel onto one twisted pair to a customer. In one embodiment, integrated access device 450 provides 3 POTs and one DSL service over a single twisted pair. In another embodiment, integrated access device 450 provides 6 POTs and one ADSL service over a single twisted pair. Integrated access device 450 includes circuitry that multiplexes voice and data signals onto a single twisted pair. In addition, the integrated access device 450 is powered over the same twisted pair. Unlike typical integrated access devices, embodiments of this invention avoid the need to provide battery back up at the customer location in order to support lifeline POTS service. In addition, embodiments of the present invention eliminate the need for special cabling required by Ethernet applications by providing data services over ADSL. COT shelf 430 provides an interface to a data network and the public switched telephone network (PSTN). In one embodiment, the data interface is an ATM interface. In another embodiment, the data interface is a frame relay interface, an Internet protocol (IP) interface or the like. In one embodiment, the COT shelf 430 interfaces with an ATM Network via a DS3. In addition, the COT shelf 430 interfaces with the PSTN via a DS1. In one embodiment, COT shelf 430 supports up to 32 customers with multi-line POTS and ADSL service. In one embodiment, each integrated access device 450 coupled to the COT shelf 430 is located up to 18,000 ft feet from COT shelf 430. The distance from the COT shelf 430 that integrated access device 450 is located is based on the gauge of the copper wire and the number of multi-line POTS available for the customer.

Figure 5:
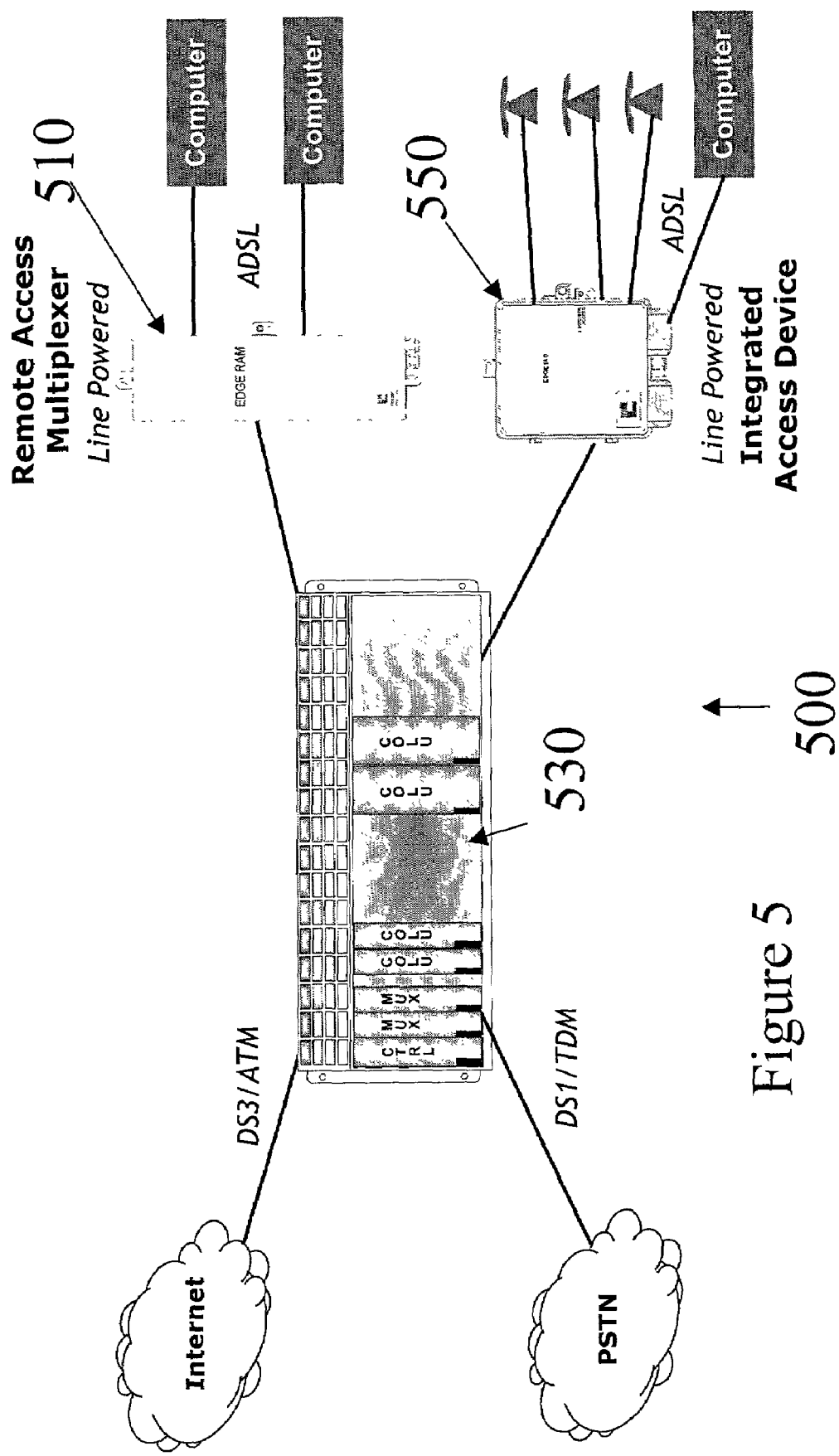
FIG. 5 is a block diagram of an embodiment of a communications system including an integrated access device and a remote access multiplexer according to the teachings of this invention.

FIG. 5 is a block diagram of one embodiment of a communications system, indicated generally at 500, including an integrated access device 550 and a remote access multiplexer 510 according to the teachings of this invention. Communication system 500 combines the additional reach capability for users out to 30,000 feet via remote access multiplexer 510 as discussed with respect to FIGS. 1–3 and the multi-line POTS and DSL over a single twisted pair via an integrated access device 550 as discussed with respect to FIG. 4 into one system. In this embodiment, remote access mutliplexer 510 is coupled to a COT shelf 530 via one or more SHDSLs. In addition, integrated access device 550 is coupled to COT shelf 530 via a single twisted pair. COT shelf 530 is interfaced with the PSTN via a DS1 interface and the Internet via a DS3.

What is claimed is:

1. A system for extending the effective distance of digital subscriber line service, the system comprising:
   a central office terminal, the central office terminal including:
   a data interface; and
   a plurality of line units;
   at least one communication link, coupled to one of the plurality of line units, that carries signals using digital subscriber line service, wherein each communication link is a twisted pair;
   at least one remote access multiplexer, coupled to the at least one communication link, wherein the at least one remote access multiplexer includes a plurality of ports that are adapted to provide digital subscriber line service;
   the remote access multiplexer adapted to multiplex signals between the plurality of ports and the at least one communication link; and
   wherein the at least one remote access multiplexer is located at a distance from the central office terminal so as to provide digital subscriber line service to user terminals that are located more than 12 kilofeet from the central office terminal.

2. The system of claim 1, wherein the central office further includes a telephony interface.

3. The system of claim 1, wherein the at least one remote access multiplexer is located at a distance from the central office terminal so as to provide digital subscriber line service to user terminals that are located between 12 and 30 kilofeet from the central office terminal.

4. The system of claim 1, and further including a splitter at the remote access multiplexer that provides telephony service over the ports of the remote access multiplexer.

5. The system of claim 1, wherein the at least one communication link provides single high speed digital subscriber line service.

6. The system of claim 1, wherein the at least one communication link comprises four communication links.

7. The system of claim 1, wherein the remote access multiplexer is powered over the at least one communication link to support lifeline plain old fashion telephone service.

8. The system of claim 1, wherein each of the at least one communication links supports up to 8 ports of a corresponding remote access multiplexer.

9. The system of claim 1, wherein the central office terminal is located at a central office.

10. The system of claim 1, wherein the central office terminal is subtended from a remote unit of a digital loop carrier.

11. The system of claim 1, wherein the central office terminal is a digital loop carrier.

12. The system of claim 1, wherein the remote access multiplexer is further adapted to multiplex a plurality of plain old fashion telephone signals and digital subscriber service signals onto each of the at least one communication link.

13. The system of claim 1, wherein the remote access multiplexer is located between approximately 12,000 and 15,000 feet from the central office terminal.

14. A system for extending the effective distance of digital subscriber line service, the system comprising:
   a central office terminal, the central office terminal including:
   a data interface, and
   a plurality of line units;
   at least one communication link, coupled to one of the plurality of line units, that carries signals using digital subscriber line service, wherein each communication link is a twisted pair;
   at least one remote access multiplexer, coupled to the at least one communication link, wherein the at least one remote access multiplexer includes:
   a first port, adapted to be coupled to the at least one communication link,
   a plurality of subscriber ports, adapted to be coupled to a plurality of communication links, and
   at least one multiplexer unit, coupled to the first port and the plurality of subscriber ports, the multiplexer unit adapted to multiplex signals between the first port and the plurality of subscriber ports; and
   wherein the at least one remote access multiplexer is located at a distance from the central office terminal so as to provide digital subscriber line service to user terminals that are located more than 12 kilofeet from the central office terminal.

15. The system of claim 14, wherein the central office terminal further includes a telephony interface.

16. The system of claim 14, wherein the at least one remote access multiplexer is located at a distance from the central office terminal so as to provide digital subscriber line service to user terminals that are located between 12 and 30 kilofeet from the central office terminal.

17. The system of claim 14, and further including a splitter at the remote access multiplexer that provides telephony service over the ports of the remote access multiplexer.

18. The system of claim 14, wherein the at least one communication link provides single high speed digital subscriber line service.

19. The system of claim 14, wherein the at least one communication link comprises four communication links.

20. The system of claim 14, wherein the remote access multiplexer is powered over the at least one communication link and provides plain old fashion telephone service lifeline support.

21. The system of claim 14, wherein each of the at least one communication links supports up to 8 ports of a corresponding remote access multiplexer.

22. The system of claim 14, wherein the central office terminal is located at a central office.

23. The system of claim 14, wherein the central office terminal is subtended from a remote unit of a digital loop carrier.

24. The system of claim 14, wherein the central office terminal is a digital loop carrier.

25. A system for extending the effective distance of asymmetric digital subscriber line service, the system comprising:
   a central office terminal, the central office terminal including:
   a data interface;
   a telephony interface; and
   a plurality of line units;
   at least one communication link, coupled to one of the plurality of line units, that carries signals using single pair high speed digital subscriber line service, wherein each communication link is a twisted pair;

at least one remote access multiplexer, coupled to the at least one communication link, wherein the at least one remote access multiplexer includes a plurality of ports that are adapted to provide asymmetric digital subscriber line service;

the remote access multiplexer adapted to multiplex signals between the plurality of ports and the at least one communication link; and wherein the at least one remote access multiplexer is located at a distance from the central office terminal so as to provide digital subscriber line service to user terminals that are located more than 12 kilofeet from the central office terminal.

26. The system of claim 25, wherein the central office terminal is a digital loop carrier.

* * * * *